(12) United States Patent
Thattai et al.

(10) Patent No.: US 11,978,437 B1
(45) Date of Patent: May 7, 2024

(54) NATURAL LANGUAGE PROCESSING

(71) Applicant: Amazon Technologies, Inc., Seattle, WA (US)

(72) Inventors: Govindarajan Sundaram Thattai, Fremont, CA (US); Qing Ping, Santa Clara, CA (US); Feiyang Niu, Hayward, CA (US); Joel Joseph Chengottusseriyil, San Jose, CA (US); Prashanth Rajagopal, San Mateo, CA (US); Qiaozi Gao, San Mateo, CA (US); Aishwarya Naresh Reganti, San Jose, CA (US); Gokhan Tur, Los Altos, CA (US); Dilek Hakkani-Tur, Los Altos, CA (US); Rohit Prasad, Lexington, MA (US); Premkumar Natarajan, Rolling Hills Estates, CA (US)

(73) Assignee: Amazon Technologies, Inc., Seattle, WA (US)

( * ) Notice: Subject to any disclaimer, the term of this patent is extended or adjusted under 35 U.S.C. 154(b) by 730 days.

(21) Appl. No.: 17/119,099

(22) Filed: Dec. 11, 2020

Related U.S. Application Data

(60) Provisional application No. 63/081,772, filed on Sep. 22, 2020.

(51) Int. Cl.
| | |
|---|---|
| *G10L 15/00* | (2013.01) |
| *G06F 16/22* | (2019.01) |
| *G06F 21/62* | (2013.01) |
| *G10L 15/18* | (2013.01) |
| *G10L 15/22* | (2006.01) |
| *G10L 15/30* | (2013.01) |

(Continued)

(52) U.S. Cl.
CPC ......... *G10L 15/1815* (2013.01); *G06F 16/22* (2019.01); *G06F 21/6218* (2013.01); *G10L 15/22* (2013.01); *G10L 15/30* (2013.01); *G10L 15/1822* (2013.01); *G10L 15/183* (2013.01); *G10L 15/19* (2013.01); *G10L 2015/223* (2013.01)

(58) Field of Classification Search
CPC ......... G10L 15/16; G10L 25/30; G10L 19/00; G10L 19/005; G10L 25/27; G10L 15/07; G10L 15/20; G10L 15/22; G10L 15/26; G10L 15/30; G10L 15/02; G10L 15/063; G10L 15/08; G10L 15/1822; G10L 15/183; G10L 15/19; G10L 15/193
See application file for complete search history.

(56) References Cited

U.S. PATENT DOCUMENTS

| | | | | |
|---|---|---|---|---|
| 10,224,031 | B2 * | 3/2019 | Kirazci | G10L 15/1822 |
| 11,205,052 | B2 * | 12/2021 | Sapugay | G06F 16/3329 |

(Continued)

*Primary Examiner* — Vu B Hang
(74) *Attorney, Agent, or Firm* — K&L Gates LLP

(57) ABSTRACT

Devices and techniques are generally described for learning personalized concepts for natural language processing. In various examples, a first natural language input may be received. In some examples, a determination may be made that the first natural language input comprises non-actionable slot data. A dialog session may be initiated with the user. In some examples, first slot data that is indicated by the user during the dialog session may be determined. In various examples, data representing the first slot data may be stored in a database in association with the first natural language input.

18 Claims, 8 Drawing Sheets

(51) Int. Cl.
    *G10L 15/183*    (2013.01)
    *G10L 15/19*     (2013.01)

(56) References Cited

U.S. PATENT DOCUMENTS 11,386,190 B2 *   7/2022   Chien ........................ H04L 9/32
2019/0361978 A1 * 11/2019   Ray .......................... G06F 40/30

* cited by examiner

NATURAL LANGUAGE PROCESSING

CROSS-REFERENCE TO RELATED APPLICATIONS

This application claims the benefit of U.S. Provisional Application No. 63/081,772, filed Sep. 22, 2020, the disclosure of which is incorporated herein by reference in its entirety.

BACKGROUND

Automatic speech recognition (ASR) combined with language processing techniques may enable a computing device to retrieve and process commands from a user based on the user's spoken commands. Natural language processing can be used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
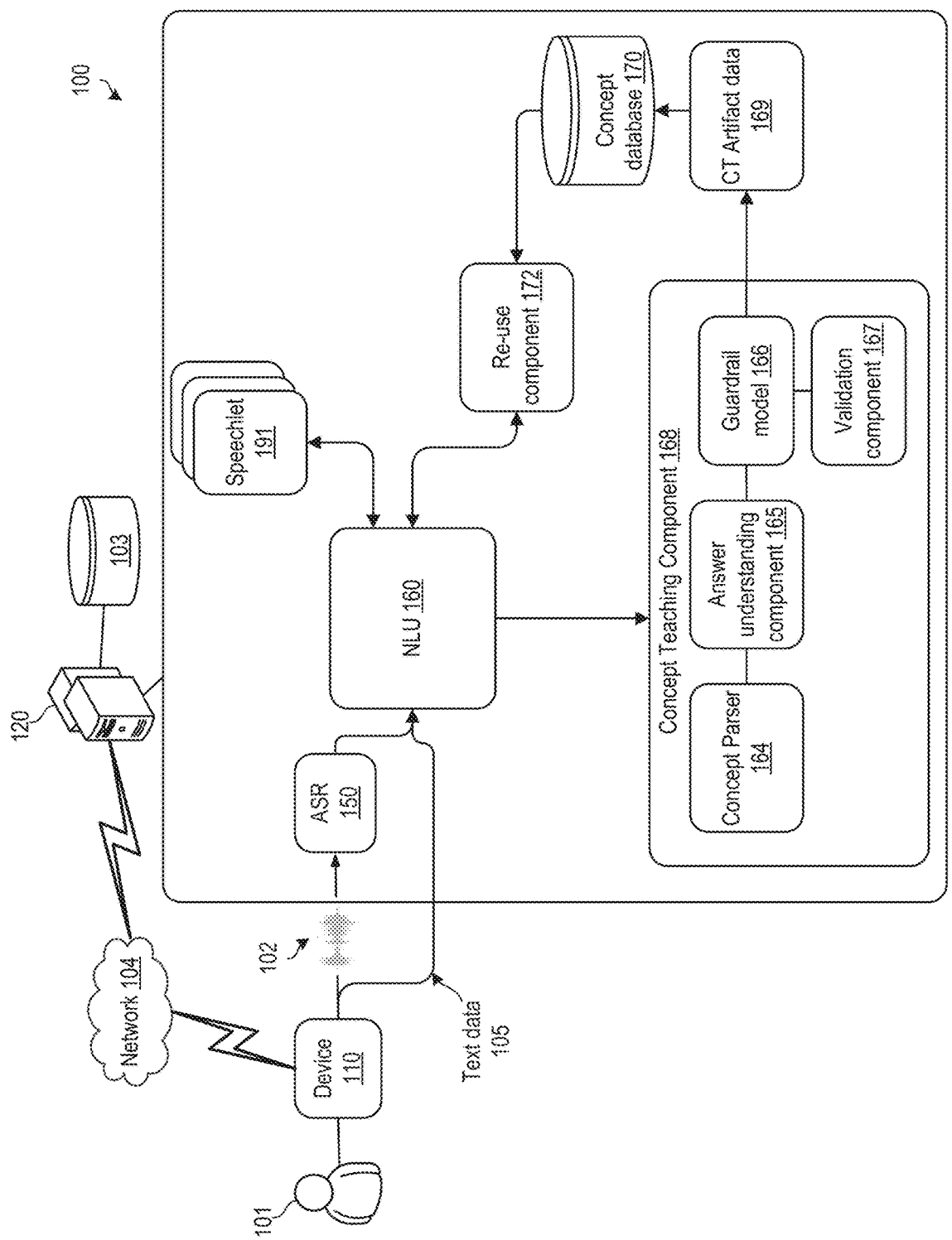
FIG. 1 is a diagram of a system configured to determine slot data in response to unrecognized slot data in a natural language input, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (e.g., a "speechlet," etc.) to perform an action. For example, the semantic intent data may include executable commands or other type of instructions. Thereafter one or more of the semantic intents may be selected for further processing and/or output by the NLU system. For example, the semantic intent associated with the highest confidence score among the different semantic intents generated may be selected for further processing and/or output.

In some examples, there may be different natural language processing speechlets. A natural language processing speechlet may be, for example, a set of natural language processing intents and/or NLU models that are configured to handle a particular type of natural language processing task. For example, there may be a shopping speechlet related to making purchases and/or navigating an e-commerce system using natural language commands. In another example, there may be a music speechlet related to controlling music playback using natural language commands. There may be a device control speechlet wherein natural language inputs are used to configure device settings (e.g., turn on/off lights, adjust thermostats, lock/unlock door locks, etc.). Various other speechlets may be used according to the specific implementation of the natural language processing system.

In various examples, voice assistants (e.g., natural language processing systems) may use pre-programmed voice commands in the form of intents (e.g., intent data) and slots (e.g., slot data), to execute the respective actions for end-users. When users use parlances outside the scope of such pre-coded commands, artificial intelligence voice assistants may be programmed to say phrases such as, "I can't help you with that," or "I'm sorry; I don't understand." In various examples described herein, natural language processing systems may be modified to include the ability to automatically identify the portion of an utterance (e.g., a particular slot, named entity, intent, etc.) that is not understood by the natural language processing systems and then learn the meaning of the portion of the utterance and the user-desired response via interactive teaching sessions with the user. As used herein, slot data that is not understood by the natural language processing system may represent an entity (e.g., a person, place, location, percentage, setting, value, number, quantity, expression of time, etc.) that is non-actionable and/or unrecognized by the natural language processing system. Accordingly, teaching dialogs may be engaged in by the concept teaching components described herein to determine actionable entity data that may be used to satisfy the user's request. The concept teaching component may be effective to learn the user's desired actionable entity data and associate this entity data with the unrecognized entity from the user's input request. For example, the concept teaching component may learn that when the user requests that the smart thermostat be set to "cozy setting" (slot data representing an unrecognized entity) that the user intends that the thermostat be set to 76° F. (slot data representing an actionable entity).

In various examples, this disclosure describes a concept teaching component 168 that may enable end-users to teach a natural language processing systems about slot data that is previously not understood by the natural language processing system. For example, the following phrases may include slot data that the natural language processing system may initially be unable to interpret: "set the family light to John's movie mode," "set the temperature to cozy setting," "get directions to my daughter's school," etc. For example, "movie mode" may not be understood as a recognized slot when controlling the family light using a lighting speechlet. Similarly, "cozy setting" may not be recognized slot data for controlling a smart thermostat using a thermostat speechlet. Finally, "my daughter's school" may not be recognized slot data for a navigation speechlet, prior to use of the concept teaching techniques described herein.

In various examples, the natural language processing systems described in this disclosure may provide the ability to implement a concept parser component that may automatically identify which part of an utterance is not understood by the system. Additionally, the natural language processing systems described in this disclosure may provide the ability to implement an answer understanding component to conduct live interactive teaching sessions with end users to enable the system to learn the concept definitions of the not understood slot data. In some further examples, the natural language processing systems described in this disclosure may provide the ability to implement a re-use component that may apply previously-learned concepts into other related contexts such as "get traffic conditions to my daughters school," "set the living room light to John's movie mode," etc.

Concept parser may be a component comprising a deep learning system that identifies which part of an utterance is not understood by the natural language processing system. For example, in the utterance "set the dining lights to my study mode," the natural language processing system may correctly determine the user's intent (e.g., an intent used to setting the named light to a certain level), but may not understand the level at which to set the light, as the slot data "study mode" may not be understood. In other words, the exact value to which to set the light is mentioned by the user as "study mode;" however, this does not indicate a definitive value at which to set the light. In various cases, it may not be possible to program the exact brightness/color value for "study-mode," as the respective value for "study mode" may be unique to each user. In various examples, such subjective phrases may be referred to as "slot concept phrases." The concept parser may be a machine learned model that is trained to identify such concept phrases from real-time utterances so that teaching sessions can be initiated with the user to learn and store such values for future references and reuse. The concept parser may also be able to determine natural language inputs that are not teachable opportunities. For example, if a user says, "set the dining room lights to . . . never mind," the concept parser may determine that the user's language "never mind" indicates that the user intended to cancel the request, as opposed to the user stating a teachable slot concept. The machine learned model(s) of the concept parser may learn whether or not a natural language input represents a teachable opportunity based on training data used to train the machine learned model(s). Additionally, the machine learned model(s) of the concept parser may output confidence scores related to the non-understood portion of the user's utterance that indicate a confidence of the non-understood portion representing a teachable opportunity.

An answer understanding component may be a deep learning model that may be used during a live teaching session with the user to understand user's definition of a certain concept-phrase (e.g., a slot concept phrase), using the explanations provided by the user, and map the slot concept phrase to the slot that was learned during the teaching session. For example, a user could respond to the question, "What do you mean by study mode?" as "Well, you know I usually study at night by setting the light to fifty percent brightness." The answer understanding component may perform a summary extraction to determine the definition phrase (e.g., "fifty percent brightness" in the current example), which may, in turn, be used by the concept teaching component to map the concept phrase to the concept definition. The mapping of the concept phrase to the concept definition may be stored as concept teaching ("CT") artifact data in a concept database and may be reused by a re-use component the next time the user uses the same slot concept phrase (e.g., "study mode") in connection with configuring the settings of a smart light. In various examples, prior to storing the CT artifact data and/or prior to sending CT artifact data to a speechlet, the user may be prompted to inquire whether the user would like the system to remember the slot concept phrase. In various examples, the system may store the CT artifact data only upon receiving user authorization.

Such live interactions with end-users during teaching sessions may be prone to error and/or user frustration. The answer understanding component may incorporate a validation component to channelize the teaching conversations towards getting the correct definitions associated with the concept phrase. Additionally, the guardrail model may determine whether the user is engaging in the teaching dialog. The dialog may be a single question and response and/or multiple turns of questions and responses. The dialog may comprise spoken utterances from the user and output audio from the natural language processing system. In other examples, the dialog may comprise other modalities such as display of options on a screen, text input from the user, selection of graphical controls, etc. For example, for the question, "what do you mean by study mode," the user could respond by saying, "I don't want to do this." The guardrail model may determine that the user is not engaging in the teaching dialog and may instead respond by saying "thank you" and by exiting the teaching session.

If the guardrail model determines that the user response is cooperative with the teaching dialog, the validation component may determine whether the user response is a valid response that is recognized by an NLU component (e.g., an NLU component).

For example, for the question, "What do you mean by study mode?" users could answer "Yeah, set it to the brightness level that is suitable for reading." The Guardrail model may determine that the user is engaging in the teaching dialog session. Prior to mapping "suitable to reading" as a slot concept for "study mode" by an answer understanding component, the validation component may send data representing "suitable for reading" to an NLU component to determine if the NLU component understands the phrase "suitable for reading." In the example, the NLU component may not understand "suitable for reading" in the context of a light setting. Accordingly, the validation component may ask a progressively easier question as part of the teaching dialog session to understand what the user intends by the phrase "study mode." For example, the validation component may generate the question, "Can you provide a light setting value for study mode?"

If a user answer provided during a teaching dialog is not actionable by the relevant intent/speechlet (e.g., non-actionable slot data), the concept teaching component may use validation component to progressively reduce the complexity of the question, so that after every failed attempt to seek a definition to a slot concept, the question posed to the user becomes progressively more simple. For example, when the user's answer is not understood at the first turn, the validation component may ask a direct question, "Can you provide me with a desired value for brightness or color?" which is less complex than the previous question that sought a definition from the user. In addition, the guardrail model aids in understanding non-responsive inputs from the users such as "oh, you are great," "How do I do that?", "Can you repeat that for me?" etc., where users are not really answering the question, but are offering an expression about the question, seeking assistance as to how to provide an answer, and/or are engaging in some other non-responsive dialog with the chat bot. In such cases, the guardrail model may identify the category of the deviation (e.g., "appreciation," "disapproval," "repeat-request," "end-request," etc.). The concept teaching component may perform the appropriate action for the category of the deviation. Accordingly, the guardrail model may determine whether a given user response is cooperative with the teaching dialog.

Additionally, the validation component may determine a device type of the device with which the user is interacting. For example, the validation component may determine (e.g., using the intent data generated in response to the user's utterance) that the user is attempting to control a smart light. There may be a small number of actions associated with control of a smart light. For example, smart light control may be limited to control of color (e.g., K value and/or wavelength) and brightness. Accordingly, the answer understanding component may communicate with the validation component to output a limited number of choices to the user related to control of a smart light. For example, for the user utterance "Computer, set lights to study mode," the validation component may send data representing the limited number of actions available for control of the smart light to the answer understanding component. The answer understanding component may, in turn, generate options for the user, such as "Would you like to adjust the color or brightness of the light?" In some further examples, the validation component may receive device identifier data indicating a device type. The device type may be associated with one or more modalities. For example, some devices may include displays, control buttons, and/or touch screens. Other devices may include only microphone arrays for voice input. Some devices may include combinations of the aforementioned interfaces. In various examples, the options presented to the user during the dialog session (e.g., as a prompt) may be selected based on the particular modalities of the device type. For example, selectable graphics (e.g., a color palette) may be displayed to a user in order to control the color of a smart light upon determination that the device with which the user is interacting includes a display.

Additionally, in some examples, the validation component may determine modalities that are compatible with the device with which the user is interacting. For example, the validation component may determine that the user is interacting with a device with a display screen. Upon determination that the user is interacting with a device with a display screen, the validation component may control output of different options in response to the user's utterance during the teaching session. For example, if the user is using a device with a display to control a smart light, an image may be displayed that depicts a selectable control such as a color bar upon which the user can select a desired color for the smart light and/or a slider bar for the user to select a brightness of the light (e.g., between 0% and 100%). The various options that may be displayed or otherwise output as selectable choices for the slot concept phrase during a teaching session may be determined based on a type of slot data (e.g., a slot data type) that is expected for the current intent and/or speechlet.

A re-use component may determine how to effectively re-use a previously-taught concept in a related context. For example, a user may have taught the concept teaching component that "full blast" means a maximum setting with respect to setting the brightness level of a light-bulb. Thereafter, concept teaching component can determine that the user utterance "Set the volume level to full blast" includes the previously-learned slot concept (e.g., "full blast"). Concept teaching component may apply the previously-learned slot concept in the new context (e.g., audio control) to perform the respective action without any additional teaching session with the user. In some examples, the mappings between a user-defined slot concept and a recognized slot (e.g., "full blast"=100%) may be stored by the concept teaching component in concept database as CT artifact data. In some other examples, the mapping may be sent to the relevant speechlet so that the speechlet can thereafter determine the appropriate action for the user based on the mapping.

Advantageously, the concept teaching techniques described herein allow a natural language processing system to learn personalized executable actions to take in response to slot concept phrases. By contrast, machine learning-based personalization techniques use large amounts of data to gradually learn a predicted action over time. Using the techniques described herein, a user may immediately re-invoke the preferred action by speaking the learned slot concept phrase (in the same context or a related context) immediately after teaching the natural language processing system the slot concept phrase.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system.

In various examples, intents (e.g., intent data) may be used by a speech processing application (e.g., a speechlet) to perform an action (e.g., to generate action data and/or other speechlet output that may be processed in order to take some corresponding action such as answering a user's question, playing video, playing audio, etc.). Natural language inputs may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Generally, as used herein the term "speechlet" may be used to refer to any code executing on a device that is effective to generate an action in response to a natural language input.

In various examples, speech processing systems may determine an intent for particular natural language input according to an interpretation of the natural language input determined by NLU. In various examples, multiple NLU process flows may be executed for a given natural language input as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entities and/or other semantic language data of a natural language input may be parsed and sent to the knowledge graph which, in turn, may be used to relate different entities and/or attributes of those entities (data describing characteristics of the entities) to one another.

Figure 3:
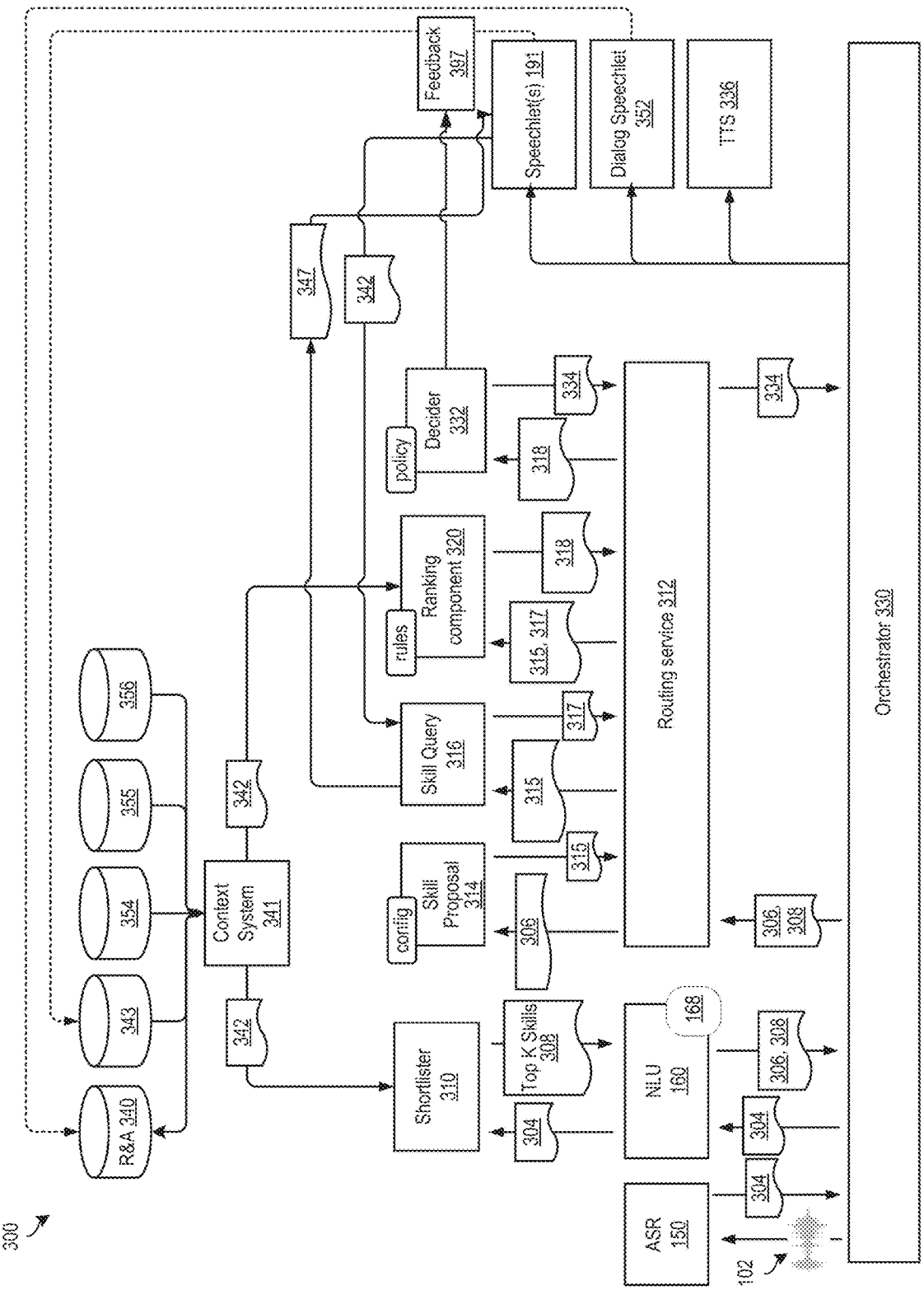
FIG. 3 is a block diagram illustrating an example speech processing system including a concept teaching component for learning slot data in response to unrecognized slot data in a natural language input, in accordance with embodiments of the present disclosure.

FIG. 1 is a diagram of a system 100 configured to determine slot data in response to unrecognized slot data in a natural language input, according to various embodiments of the present disclosure. In various examples, a user account 101 may communicate with an input device 110. Input device 110 may be a speech-processing enabled device and may be effective to continually "listen" for a wake word. Upon detection of a wake word, input device 110 may record and send audio over network 104 to a natural language processing system 120. Natural language processing system 120 may include one or more computing devices effective to perform various techniques to generate a semantic representation of natural language input data and generate responses thereto. Natural language processing system 120 may include fewer or additional components apart from those specifically shown and described in FIG. 1. For example, FIG. 3 depicts an example of a more detailed natural language processing system that may be used in accordance with various aspects of the present disclosure.

In an example, audio data 102 representing a user query may be sent over network 104 to natural language processing system 120. Network 104 may be a wide area network (WAN), such as the Internet, or may be a local area network (LAN). In various other examples, input device 110 may be configured to receive text data and/or may perform speech recognition locally. In such examples, input device 110 may send text data 105 representing natural language input data over network 104 to natural language processing system 120.

In various examples, the audio data 102 may be sent by the natural language processing system 120 to ASR component 150. ASR component 150 may generate text data representing the audio data. The text data representing the audio data 102 may be sent to NLU component 160. In examples where user account 101 provides text input and/or where the input device 110 generates and sends text representing a user utterance, text data 105 may be sent to NLU component 160.

NLU component 160 may employ a number of different natural language understanding strategies, in a federated approach, in order to understand natural language input data. In various examples, NLU component 160 may determine a domain corresponding to a particular natural language input. Domains may be determined using keywords in the input (e.g., using slot data and/or entity recognition) and/or by using context data associated with the natural language input (e.g., device ID, account ID, time, location, etc.). In various examples, non-transitory computer-readable memory 103 may store instructions effective to program at least one processor (e.g., processors and/or processor cores associated with computing devices of natural language processing system 120) to perform the various techniques described in the current disclosure.

NLU component 160 may determine an intent representing the natural language input. In the case of a natural language input that is classified by concept parser 164 as a slot concept phrase, answer understanding component 165 may engage the user in a dialog session configured to learn the slot data intended by the user for the slot concept phrase. A slot concept phrase may be a natural language input (e.g., a spoken user request or command and/or a text input) for which the intent is recognized, but for which the slot data is unrecognized by the natural language processing system 120.

Concept parser 164 may be a machine learning model (e.g., a classifier neural network, etc.) that may be trained in a supervised or unsupervised manner). For example, a classifier may be trained using slot concept phrases including undefined (e.g., unrecognized) slot data. The undefined/non-actionable slot data described herein may include an unrecognized entity (e.g., in the user request "Set lights to spooky mode," "spooky mode" may be slot data representing an unrecognized entity. As used herein, an entity may refer to a person, place, location, percentage, setting, value, configuration, number, quantity, expression of time, etc. The concept parser 164 may receive data representing the user utterance and data representing the unrecognized entity as inputs and may determine whether the unrecognized entity is teachable through a teaching dialog to seek clarification from the user.

Upon identification of a slot concept phrase by concept parser 164, answer understanding component 165 may be invoked. Answer understanding component 165 may be a machine learning model (e.g., a neural network, etc.) effective to predict a desired action to be taken based on a dialog session with the user and create a mapping between the user-provided slot concept and actionable slot data. For example, if the user says "Computer, set the lights to spooky mode," the answer understanding component 165 may prompt the user for clarification by saying, for example, "What light level would you like for spooky mode?"

Guardrail model 166 may determine whether user responses provided during the teaching dialog session are participating in the teaching component or whether they are unrelated to the teaching dialog session. Validation component 167 may determine whether user response provided during the teaching dialog session are actionable by the relevant speechlet 191. If not, validation component 167 may provide instructions effective to cause answer understanding component 165 to ask progressively simpler and more specific questions during the teaching dialog session in order to determine the meaning of the user's slot concept phrase. For example, validation component 167 may request a specific value for light levels, temperatures, etc.

After learning the slot data in the slot concept phrase and the desired action associated with the slot data (e.g., through a dialog session instituted by answer understanding component 165 and/or controlled by guardrail model 166 and validation component 167), the learned slot data/desired action may be stored in association with the slot concept phrase as CT artifact data 169 and may be stored in concept database 170. Concept database 170 may be a non-transitory computer-readable memory and/or database that is specific to a particular account, in order to personalize the learning of the slot concept phrases.

Figure 2:
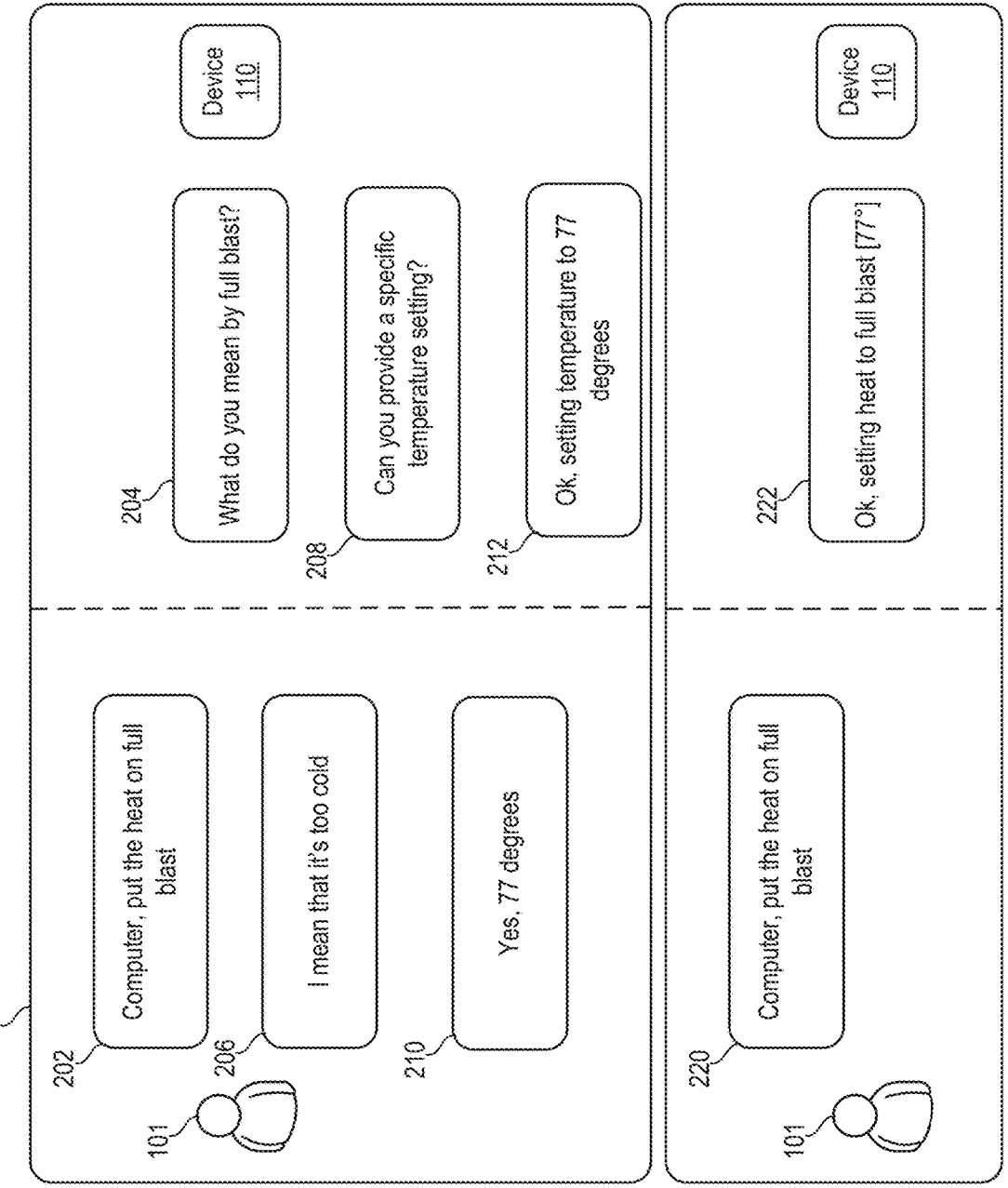
FIG. 2 depicts two example dialog sessions that may be used to determine slot data in response to unrecognized slot data in a natural language input, in accordance with various embodiments of the present disclosure.

FIG. 2 depicts two example dialog sessions that may be used to determine an executable action in response to a slot concept phrase, in accordance with various embodiments of the present disclosure. In various examples, the concept teaching component 168 and/or, more specifically, the answer understanding component 165 may carry out teaching session 266 and/or the other dialog session depicted in FIG. 2.

In the example teaching session 266, the user may initially state, "Computer, put the heat on full blast," as utterance 202. Concept parser 164 of concept teaching component 168 may determine that the intent is known (e.g., a Turn on heat intent), but that the slot data "full blast," intended to describe a level at which the heat should be set, is unrecognized. Further, concept parser 164 may determine that the phrase "Computer, put the heat on full blast" represents a teachable opportunity as the intent is recognized, but the slot data is not recognized. Accordingly, answer understanding component 165 may engage the user in a dialog session to learn the slot concept phrase and/or appropriate action. Initially, the answer understanding component 165 of device 110 may output the question (e.g., as audio via TTS and/or via displayed text), "What do you mean by full blast?" (block 204).

In the example of FIG. 2, the user may respond, "I mean that it's too cold" (block 206). Guardrail model 166 may determine that this user response is participating in the teaching session 266. However, validation component 167 may determine that this response does not provide slot data that is actionable by the natural language processing system 120. Accordingly, answer understanding component 165 may be controlled by validation component 167 to generate a more direct, simple question used to solicit an actionable response. In the example, the question is, "Can you provide a specific temperature setting?" (block 208). In the example, the user responds, "Yes, 77 degrees" (block 210). This may be an actionable response. Validation component 167 may validate the response by passing the user-provided slot data to the appropriate speechlet 191 (e.g., a thermostat speechlet in the current example). The thermostat speechlet may recognize the slot data "77 degrees." Accordingly, CT artifact data 169 mapping the slot data "full blast" with the actionable slot data "77 degrees" may be generated by answer understanding component 165 and may be stored in concept database 170. The device 110 may output the response, "Ok, setting temperature to 77 degrees" and may control a smart thermostat (using a thermostat speechlet) to set the target temperature to 77 degrees (block 212).

The next time the user uses the slot concept phrase, "full blast" in a context related to temperature, the re-use component 172 may retrieve the CT artifact data 169 from concept database 170 using the "full blast" slot data to lookup the appropriate actionable value (e.g., 77 degree temperature setting). Accordingly, the next time the user requests "Computer, put the heat on full blast" (block 220), the device 110 may respond by setting the heat to the previously-learned target temperature of 77 degrees and may respond by saying, "Ok, setting heat to full blast" (block 222). In some other examples, the CT artifact data 169 may be sent to the relevant speechlet 191 (e.g., the thermostat speechlet). In such an example, the next time the user states "Set the temperature to full blast," the thermostat speechlet may understand and process the request without calling the concept teaching component 168.

Notably, once the concept teaching component 168 has learned a slot concept phrase and stored CT artifact data 169 in concept database 170, the slot concept phrase can immediately be invoked by a user in the same (and/or in a related) context. This can be contrasted with some other personalization/learning approaches, in which machine learning models are retrained in order to learn new and/or personalized behaviors. In the various techniques described herein, no retraining of machine learning models is required in order to learn slot concept phrases.

A determination as to whether a learned slot concept phrase may be used in other contexts (e.g., for other speechlets) beyond the original context for which the slot concept phrase was learned may be made based on a type of the slot data (e.g., a slot data type). For example, a user may originally state, "Give me directions to my daughter's school." This phrase may invoke a directions speechlet. However, "my daughter's school" may be unrecognized slot data. Accordingly, concept teaching component 168 may be used to generate a mapping between the slot concept phrase "my daughter's school" and actionable slot data (e.g., a street address of the daughter's school). The actionable slot data may be of the slot data type "location data." Accordingly, in some examples, the learned slot concept phrase may be used in association with other speechlets that use slot data of the slot data type "location data." For example, after the teaching session, the user may state, "give me the weather at my daughter's school." This request may invoke a weather speechlet. The slot concept "my daughter's school" may not be recognized by the weather speechlet. However, the weather speechlet (and/or NLU component 160) may call the re-use component 172 to retrieve the previously-learned slot concept data of the slot data type "location data" for "my daughter's school" from concept database 170. Accordingly, the weather speechlet may determine the weather at the requested location using the previously learned slot concept.

FIG. 3 is a block diagram illustrating an example speech processing system 300 including a concept teaching component 168 for learning slot data in response to unrecognized slot data in a natural language input, according to various embodiments of the present disclosure.

The various components illustrated in FIG. 3 may be located on the same or different physical devices. The various components illustrated in FIG. 3 may be components of natural language processing system 120. Communication between various components illustrated in FIG. 3 may occur directly or across a network. A speech processing-enabled device may capture audio using an audio capture component, such as one or more microphone(s). The speech processing enabled device may send audio data 102 (e.g., corresponding to an utterance) to an orchestrator 330 of the speech processing system 300. The speech processing enabled device may also send metadata (e.g., including device identifiers, device type data, contextual data, IP address data, room location data, etc.) to the orchestrator 330. The components depicted in FIG. 3, including components of a speech processing system may be generally referred to as spoken language processing components, a speech processing system 300 a spoken language processing system, speech processing components, and/or a speech processing routing system. Additionally, in various examples, the components depicted in FIG. 3 may process written input (e.g., text data) in addition to spoken input.

Upon receipt by the speech processing system 300, the audio data 102 may be sent to an orchestrator 330. The orchestrator 330 may include memory and logic that enables the orchestrator 330 to initiate a dialog session and to transmit various pieces and forms of data to various components of the system, as described in further detail below.

The orchestrator 330 may send the audio data 102 to an ASR component 250 (e.g., a speech recognition component). The ASR component 250 may transcribe the audio data 102 into one or more hypotheses representing speech contained in the audio data 102. The ASR component 250 interprets the speech in the audio data based on a similarity between the characteristics of the audio data corresponding to the speech and pre-established language models. For example, the ASR component 250 may compare the audio data 102 with models for sounds (e.g., subword units such as phonemes) and sequences of sounds to identify words that match the sequence of sounds in the speech represented in the audio data 102. The ASR component 250 may send text data 304 generated thereby to orchestrator 330 that may, in turn, send the text data 304 to NLU component 160 and/or concept teaching component 168. As previously described, the text data 304 may include one or more ASR hypotheses. The text data 304 may include a top scoring hypothesis of the speech represented in the audio data 102 or may include an N-best list including a group of hypotheses of the speech represented in the audio data 102, and potentially respective ASR processing confidence scores. As previously described, in some other examples, the ASR component 250 (and/or other components of the speech processing system 300) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 300), a number of tokens output by ASR, etc.

The NLU component 160 attempts to make a semantic interpretation of the phrases or statements represented in the text data input therein. That is, the NLU component 160 determines one or more meanings associated with the phrases or statements represented in the text data 304 based on individual words represented in the text data 304. The NLU component 160 interprets a text string to derive an intent of the user (e.g., an action that the user desires be performed and/or a state described by the user) as well as pertinent pieces of information in the text data that allow a device (e.g., the speech processing enabled device, the speech processing system 300, a computing device(s) implementing a speechlet, etc.) to complete the intent. For example, if the text data 304 corresponds to "Set living room light to study mode," the NLU component 160 may determine the user intended to invoke a light-setting intent. However, the NLU component 160 may not initially recognize the slot data "study mode." Instead, concept parser 164 may determine that "set living room light to study mode" is a slot concept phrase and may initiate a teaching session using answer understanding component 165, as described above.

In various examples, a federated NLU approach may be employed in which a number of different NLU strategies are used to determine various NLU output data. The NLU output data may be ranked and the best output (and/or a list of the best NLU outputs) may be sent to downstream components. As previously described, in addition to the NLU intent and slot data, the NLU component 160 may generate other metadata associated with the utterance (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speechlet, intent, and/or slot), entity recognition confidence scores, entity recognition match types (e.g., exact match, prefix match, suffix match, etc.), etc. Herein, the data output by the NLU component 160 (depicted in FIG. 3 as "NLU COMPONENT 160") is referred to as NLU output data 306.

In some examples, state data associated with the current intent (e.g., the light-setting intent) may be sent to concept teaching component 168 (which may be part of NLU component 160 and/or which may be a separate speechlet). The concept teaching component 168 may determine an action desired by the user through a dialog session as previously described. However, if the concept teaching component 168 has previously learned the slot concept phrase (e.g., through a previous teaching session invoked by concept teaching component 168), re-use component 172 may retrieve the corresponding slot data learned during the teaching session stored in concept database 170.

NLU component 160 may send the text data 304 and/or some of NLU output data 306 (such as intents, recognized entity names, slot values, etc.) to a shortlister 310. The shortlister 310 may comprise one or more machine learning models that may be effective to predict a subset of speechlets that are most likely to be able to correctly process the input data, based on the input of the text data 304 and/or the NLU output data 306. In addition, the shortlister 310 may call the ranking and arbitration component 340 to request features pre-computed by the ranking and arbitration component 340 according to features used as inputs by the machine learning models of shortlister 310. As previously described, the shortlister 310 may define source data used to compute the features and/or may specify functions used to generate the features from the source data (e.g., formulae and/or functions) prior to runtime processing of input data. The ranking and arbitration component 340 may precompute the features according to the specified feature definitions supplied by shortlister 310 and by the other components of speech processing system 300 and may store the precomputed features in memory. Ranking and arbitration component 340 may generate indexes that may be used to retrieve the precomputed features during runtime (e.g., through an API). Accordingly, during runtime processing, shortlister 310 may retrieve the precomputed features from ranking and arbitration component 340 and may use the precomputed features (among other inputs) to predict a subset of speechlets that are most likely to be appropriate to process the current input data.

Shortlister 310 may send the top K speechlets 308 to NLU component 160. NLU component 160 may thereafter perform speechlet-specific NLU processing (and/or question-and-answer processing by a question and answer NLU component) for the speechlets in the top K speechlets 308 to determine speechlet-specific intents, slots, and/or named entities. NLU output data 306 may include such speechlet-specific data (e.g., speechlet-specific N-best hypotheses).

Ranking and arbitration component 340 may communicate with various systems in order to obtain source data used to precompute features. For example, ranking and arbitration component 340 may communicate with feedback storage 343 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 300. As previously discussed, in various examples user feedback data may be predicted for input data prior to processing the input data using a speechlet 191. In various examples, user feedback data may be used to pre-compute various features used by machine learning models of speech processing system 300. Accordingly, in some examples, the speechlets selected for processing particular input data may be determined based at least in part on speechlets that a user (or a group of similar users) has responded positively to in the past.

Additionally, ranking and arbitration component 340 may communicate with endpoint context system 354, which may provide context data at the conclusion of a user interaction with the speech processing system 300. In another example, ranking and arbitration component 340 may communicate with speechlet data 356 to determine information from the speechlet regarding past interactions with the speechlet and/or data acquired by the speechlet. Additionally, ranking and arbitration component 340 may communicate with other data sources 355, as new services are added and/or as new data types that may be useful for routing prediction are made available. In addition to ranking and arbitration component 340 using context data 342 to precompute features used by various machine learning models of the routing architecture of the speech processing system 300, a context system 341 may receive the context data 342. The context system 341 may provide the context data directly to both ranking and arbitration component 340 as well as to various components of the routing architecture of speech processing system 300. For example, the context system 341 may send context data 342 to shortlister 310 and/or ranking component 320 in order to determine a shortlist of speechlets 191 for particular input data and/or in order to rank the shortlisted speechlets.

NLU output data 306 (which may, in some examples, include state data associated with a slot concept phrase and/or slot data determined by answer understanding component 165) and top K speechlets 308 may be sent by NLU component 160 to orchestrator 330. Orchestrator 330 may send the top K speechlets 308 and the NLU output data 306 to routing service 312. Routing service 312 may send the top K speechlets 308 and NLU output data 306 to speechlet proposal component 314. Speechlets 191 may subscribe to particular intents using speechlet proposal component 314. For example, if state data is used to determine a particular slot concept phrase, (using previously-learned CT artifact data), NLU output data 306 may include sending the previously-learned slot data together with the intent to the relevant speechlet 191.

Accordingly, speechlet proposal component 314 may receive the NLU output data 306 and may determine whether any of the included intents correspond to one or more of speechlets 191. If so, speechlet proposal component 314 may generate candidate data comprising <Intent, Speechlet> candidate pairs 315. The candidate pairs 315 may be sent to routing service 312 and may be sent by routing service 312 to speechlet query service 316. Speechlet query service 316 comprises an API through which speechlets 191 may "opt out" of particular requests. For example, a speechlet 191 may comprise a video playback speechlet. Accordingly, the speechlet 191 may register with speechlet query service 316 to indicate that only requests made on a device with a display screen should be routed to the particular speechlet 191. In addition, speechlets 191 may communicate availability information, pricing information, and/or other structured descriptions of how and under what circumstances (e.g., determined using context data) the speechlet 191 can fulfill a request represented by the current input data. Speechlet query service 316 may send a signal 317 indicating what speechlets can fulfill a particular request (and/or what speechlets are unable to fulfill the request). The signal 317 may be sent to routing service 312. Routing service 312 may send the signal 317 along with the candidate pairs 315 to a ranking component 320. As depicted in FIG. 3, speechlets 191 may send context data 342 to speechlet query service 316 to indicate situations in which a speechlet may opt out of processing a particular request (e.g., if the device sending the input data does not include a display screen, etc.). In various examples, the context data 342 sent by speechlets 191 to speechlet query service 316 may be speechlet and/or request specific context data. Additionally, speechlet query service 316 may send intent requests 347 to speechlets 191.

Ranking component 320 may include one or more statistical machine learning models effective to rank the candidates included in candidate pairs 315. In order to rank the candidate pairs 315, ranking component 320 may generate confidence scores for each corresponding candidate pairs 315. A confidence score may indicate that the corresponding speechlet 191 and/or intent of the candidate pair is appropriate to process the request. Ranking component 320 may compute features using the candidate pairs 315 and signal 317 in order to predict the ranking of the speechlets 191 included in the candidate pairs 315. The features computing during processing of the input data (sometimes referred to as "runtime features") may comprise a feature representation of the list of candidate pairs 315 and/or a representation of the signal 317. Additionally, ranking component 320 may query ranking and arbitration component 340 for precomputed features that have been defined for use by ranking component 320. As previously described, the precomputed features may be determined based on contextual data, user feedback data, past usage data, speechlet data, previous rankings of ranking component 320, etc. Additionally, ranking component 320 may compute runtime features using context data 342, user feedback data from feedback storage 343, and/or other data sources. In various examples, the loss function for the machine learning models of ranking component 320 may optimize based on user satisfaction scores computed using user feedback data from feedback storage 343.

Ranking component 320 may generate a ranked list 318 of the candidate speechlets indicated in candidate pairs 315. In at least some examples, the ranking component 320 may use a deep neural network as a machine learning model for determining the ranked list 318. In some examples, ranking component 320 (and/or some other speech processing system 300 component, such as decider engine 332) may determine plan data that may override the ranked list 318 such that a lower ranked speechlet among the candidate pairs 315 may be selected for processing the input data.

In another example, the decider engine 332 may store policies that may control whether or not explicit user feedback is solicited (e.g., via TTS) after the completion of an action (e.g., by the top-ranked speechlet determined by the ranker component). Explicit feedback may be solicited through the dialog speechlet 352 prior to routing input data to a speechlet for processing. In another example, decider engine 332 may control feedback component 397 to request explicit feedback from a user post-speechlet processing (e.g., via TTS). In various examples, feedback component 397 may ask the user whether or not the user was satisfied with the action taken by the speech processing system 300. In yet another example, an exploration policy defining a dynamic routing adjustment may send input data that matches predicate data defined using the dynamic routing adjustment component to a newly-implemented speechlet 191. The decider engine 332 may determine that the top ranked result from the ranking component 320 should be ignored due to the dynamic routing adjustment being performed by the dynamic routing adjustment component. Additionally, in some examples, a policy of the decider engine 332 may be to solicit explicit feedback from the user whenever a new speechlet is routed to due to a dynamic routing adjustment. Accordingly, at the completion of the action, the decider engine 332 may control TTS to inquire as to whether the user was satisfied with the interaction with the new speechlet and/or whether the performed action was the action intended by the user.

Decider engine 332 may output plan data that comprises a routing plan 334 for processing the input data. The routing plan 334 may define a target speechlet 191 (and/or may identify concept teaching component 168) to process the input data. As described above, the target speechlet 191 may be selected as the top-ranked hypothesis determined by the ranking component 320. In some other examples, the decider engine 332 may select a target speechlet 191 based on a policy, as described above. In some examples, the ranking component 320 may determine that two different speechlets are equally applicable for processing the input data. In such examples, the decider engine 332 may determine that disambiguation should occur. Accordingly, the routing plan 334 may include sending the input data to a dialog speechlet 352 that may output (via TTS) one or more questions (e.g., a disambiguation request) used to prompt the user to disambiguate between the two equally likely (or approximately equally likely) interpretations of the input data. In various examples, answer understanding component 165 may be implemented as a dialog speechlet 352. For example, it may be unclear, based on a user's request, whether the user intended to invoke a movie playback speechlet or a music playback speechlet, as a movie and a soundtrack for the movie may be identified using the same name. Accordingly, the decider engine 332 may determine that the top two hypotheses of ranking component 320 are equally likely (or approximately equally likely) and may determine that a question should be asked to disambiguate between the two possible actions. Accordingly, the routing plan 334 may route the input data to the dialog speechlet 352, and the dialog speechlet 352 may inquire whether the user intended to play the movie or the soundtrack.

In another example, the decider engine 332 may determine that the user was not satisfied with the top hypothesis of the ranking component 320 (e.g., due to explicit or implicit feedback received from the user in response to taking an action associated with the top ranking component 320 hypothesis). Accordingly, the decider engine 332 may determine that the routing plan 334 should be to determine the second highest ranked hypothesis of the ranking component 320.

If a speechlet 191 outputs natural language text in response to processing, the orchestrator may send the text to TTS component 336 for output as audio representing the speech.

Figure 4:
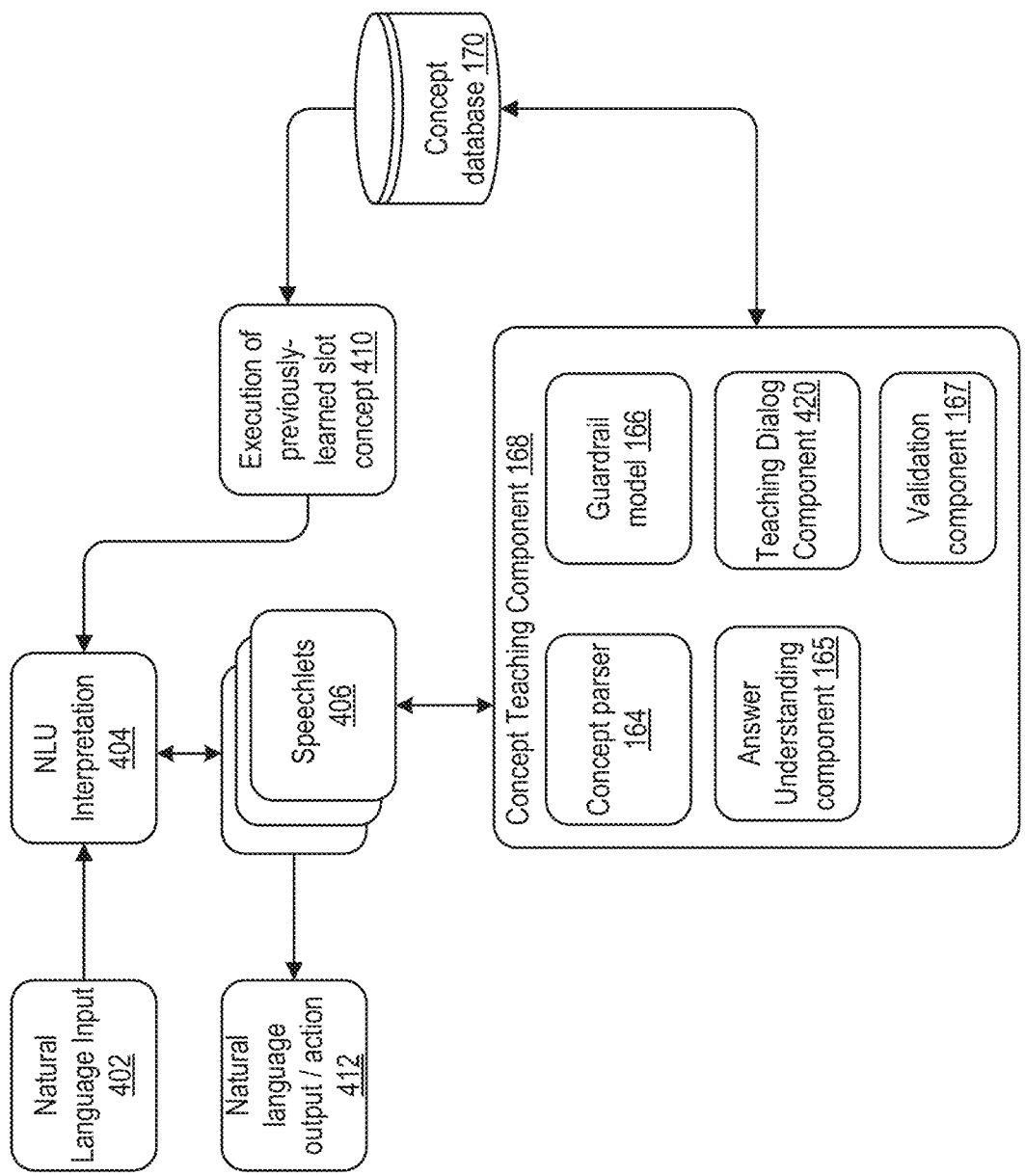
FIG. 4 depicts a block diagram illustrating an example of execution of a previously-taught action in response to unrecognized slot data in a natural language input, in accordance with various aspects of the present disclosure.

FIG. 4 depicts a block diagram illustrating an example of execution of a previously-taught concept in response to unrecognized slot data in a natural language input, in accordance with various aspects of the present disclosure. In the example depicted in FIG. 4, a natural language input 402 is received. An NLU interpretation 404 is determined for the natural language input 402. In various examples, the NLU interpretation 404 may be used to determine a particular speechlet 406 that may be used to further process the NLU interpretation 404 to determine an intent. In various examples, if the NLU interpretation 404 is determined to include actionable content (e.g., a named entity, slot data, words invoking a specific intent and/or speechlet, etc.), intent data related to the actionable content may be determined and the intent data may be used to execute the appropriate action by the speechlet 406 to generate natural language output/action 412. Conversely, if NLU interpretation 404 does not include recognized slot data, concept parser 164 may determine that the NLU interpretation 404 comprises a slot concept phrase.

Answer understanding component 165 may initiate teaching a teaching dialog session (e.g., using teaching dialog component 420 and/or TTS 336). Teaching dialog component 420 may initiate a dialog session that may be used to determine the slot value associated with the slot concept phrase. For example, if the user requested that a light be set to "study mode", the dialog session may be used to determine the specific light setting intended by the user that corresponds to "study mode" (e.g., light setting at 100%). Guardrail model 166 may determine if the user's response(s) during the teaching dialog session are participating in the teaching dialog session. If so, the validation component 167 may determine whether the user's response(s) are understood by the NLU processing system and/or the relevant speechlet.

In some other examples, the state data may be sent to re-use component 172 (not shown in FIG. 4). Re-use component 172 may be used to lookup previously learned slot data for previously-received slot concept phrases. For example, re-use component 172 may use the state data as a search query to query concept database 170 for concepts previously learned by concept teaching component 168. As previously described, the concept database 170 may be specific to a user and thus may store personalized slot concept phrases in association with learned slot data for the respective slot concept phrases. If the state data is associated with previously-learned slot data, data identifying slot values may be returned. Accordingly, the previously-learned action may be executed at block 410 by sending the slot values and the intent data from the NLU interpretation 404 to either the NLU component 160 and/or to the appropriate speechlet 406.

Figure 5:
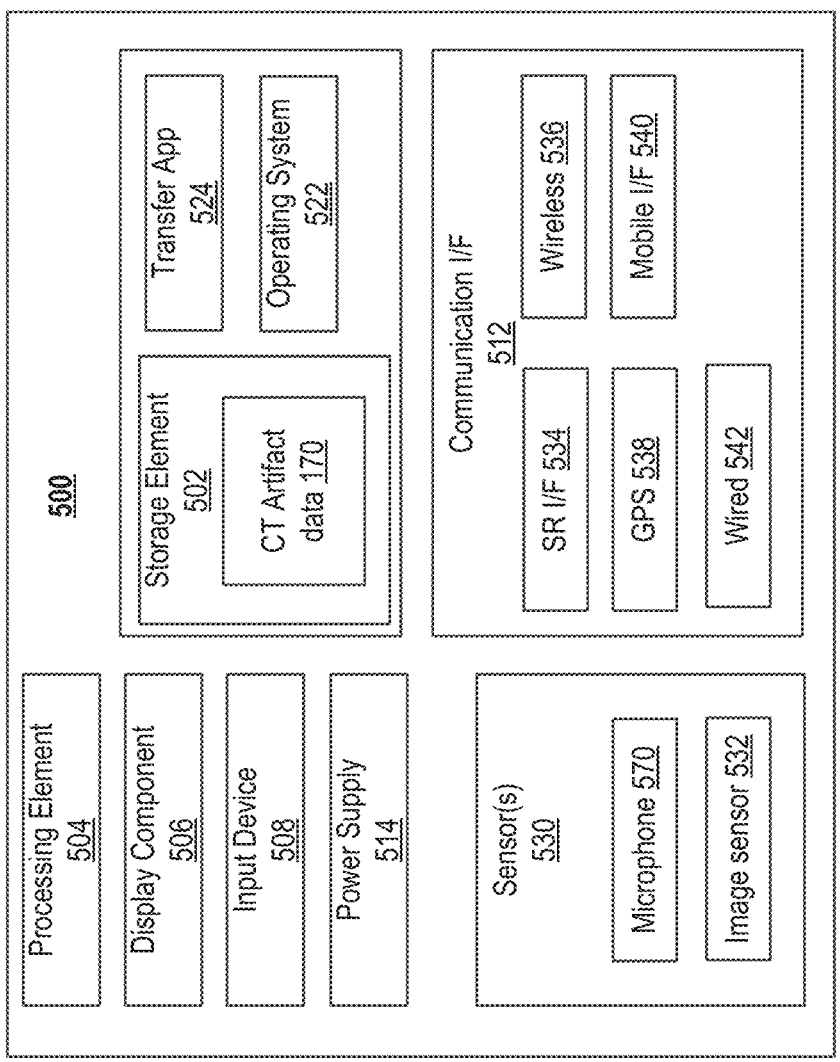
FIG. 5 is a block diagram showing an example architecture of a computing device that may be used to generate actions in response to natural language inputs, in accordance with various embodiments described herein.

FIG. 5 is a block diagram showing an example architecture 500 of a computing device that may be used to access and/or implement natural language processing system 120, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models used in natural language processing (and/or parameters thereof), various NLU models, knowledge graphs, response templates, FSTs, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing.

The multiple devices may include overlapping components. The components of the natural language processing system 120, as described herein, are exemplary, and may be located as a stand-alone device or may be included, in whole or in part, as a component of a larger device or system.

Figure 6:
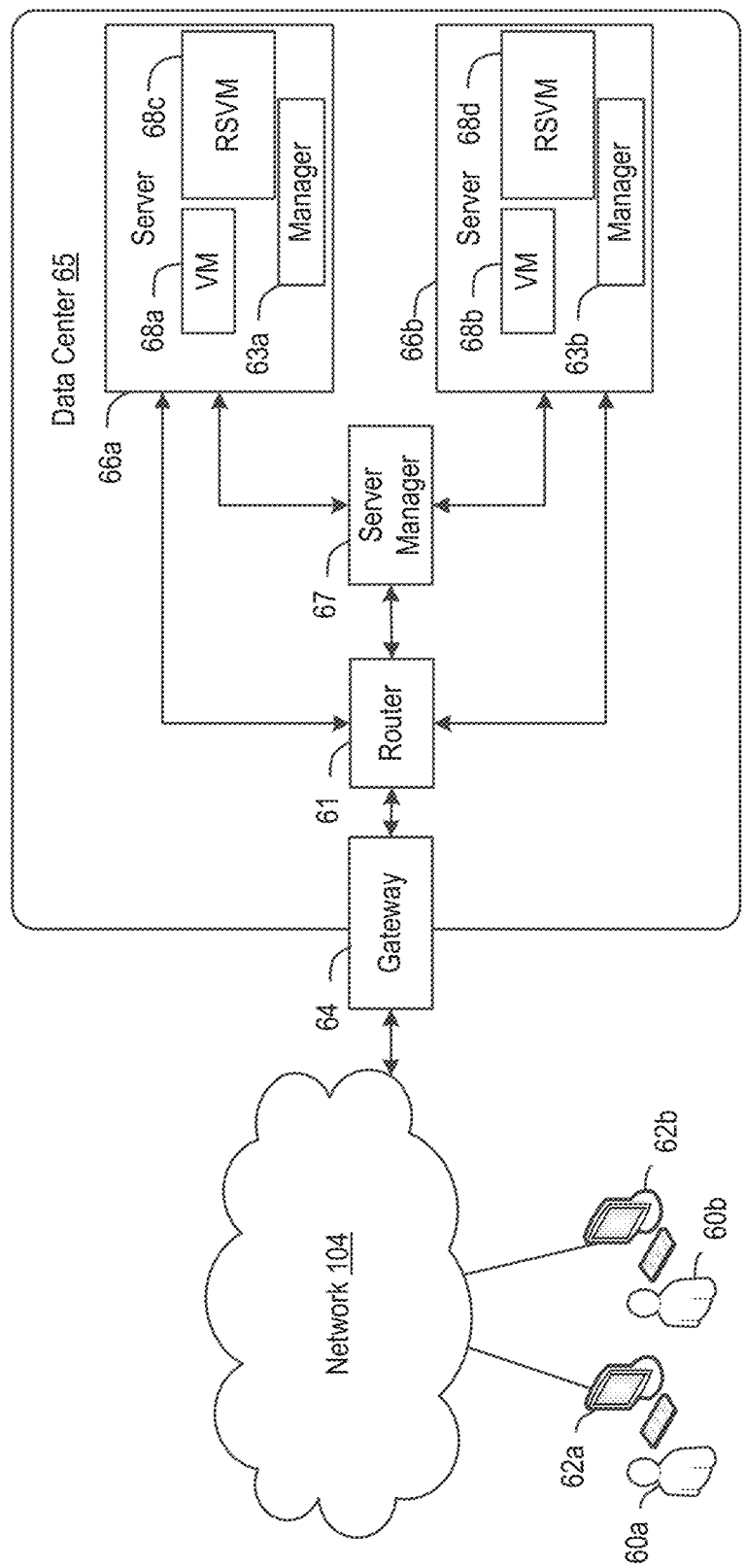
FIG. 6 is a diagram illustrating an example system for sending and providing data that may be used in accordance with the present disclosure.

An example system for sending and providing data and processing data of natural language processing systems will now be described in detail. In particular, FIG. 6 illustrates an example computing environment in which the embodiments described herein may be implemented. For example, the computing environment of FIG. 6 may be used to provide natural language processing as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various natural language processing techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 7:
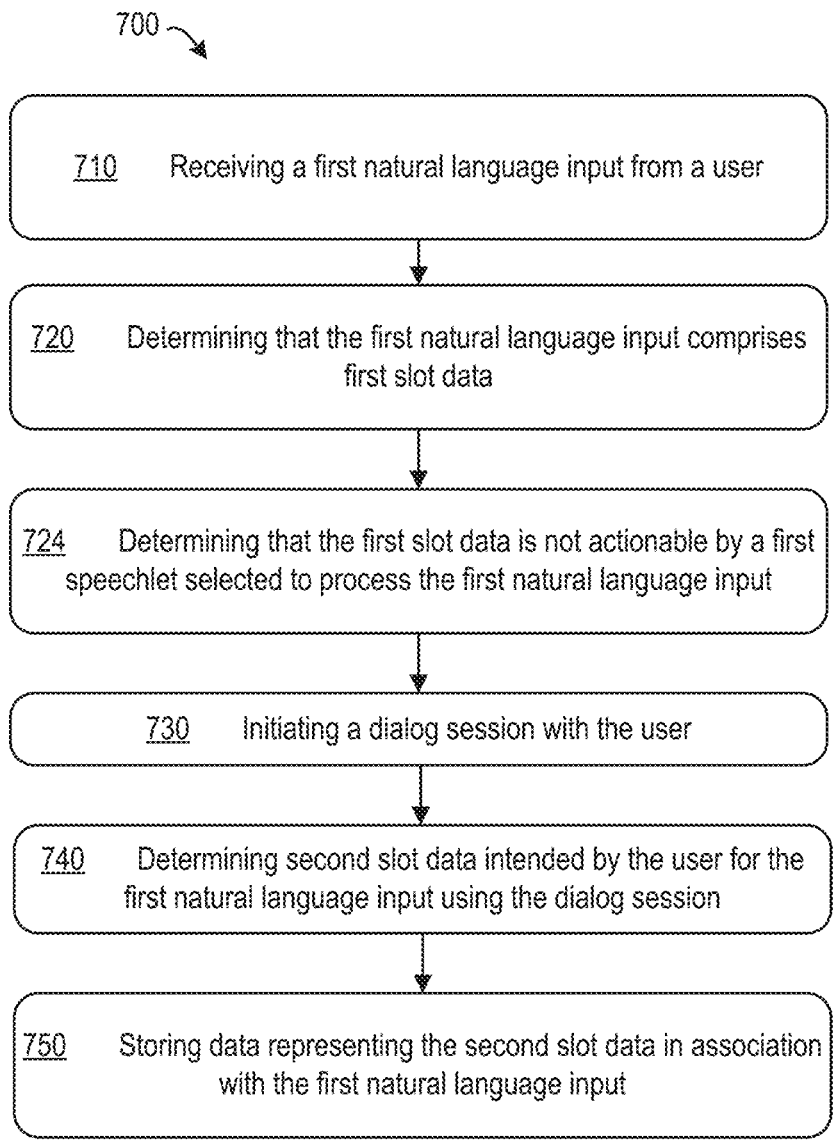
FIG. 7 depicts a flow chart showing an example process for learning a user-specific concepts to take in response to a natural language inputs, in accordance with various aspects of the present disclosure.

FIG. 7 depicts a flow chart showing an example process 700 for learning a user-specific action to take in response to a natural language input, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which a first natural language input from a user may be received. In various examples, the first natural language input may be speech or text representing a slot concept phrase. As previously discussed, a slot concept phrase may be a phrase for which the intent is understood by NLU component 160, but where one or more slots are unrecognized. For example, the user may state, "Computer, set lights to party mode." The utterance includes a known intent (e.g., set-lighting), but the slot data "party mode" may not be recognized by the natural language processing system and/or by a lighting skill used to toggle lighting settings.

Processing may continue from action 710 to action 720, at which a determination may be made that the first natural language input comprises first slot data. At action 720, natural language understanding processing may be performed by NLU component 160. The NLU component 160 may be configured to execute one or more NLU processes in order to determine an intent representing a semantic meaning of the first natural language input as well as slot data indicating one or more entities related to the action (e.g., entities that are parameters related to the desired action and/or subjects of the desired action). A routing architecture of the speech processing system (e.g., speech processing system 300) may select a speechlet for processing the intent data and the slot data determined for the first natural language input.

Processing may continue from action 720 to action 724, at which a determination may be made that the first slot data is not actionable by a first speechlet selected to process the first natural language input. As previously described, intent data and slot data may be generated by NLU component 160 as data representing the first natural language input. Additionally, a first speechlet may be selected to which to route and process the intent data and slot data in order to perform the user-requested action. However, in some examples, while the intent data may be recognized by the first speechlet (e.g., a thermostat control speechlet may recognize a "set thermostat" intent), the slot data may represent an unrecognized entity that is not actionable by the first speechlet. For example, the user may say, "Computer, set thermostat to cozy mode." NLU component 160 may determine the intent data "set thermostat" and the slot data "cozy mode" representing an entity. A first speechlet may be selected to process the intent data and the slot data (e.g., as described above in reference to FIG. 3). However, upon routing the intent data and the slot data to the first speechlet, the first speechlet may determine that the particular slot data comprises an entity that is not actionable (e.g., that is unrecognized).

For example, the first speechlet may be a thermostat control speechlet. The intent data may be the "set thermostat" intent, which may be an actionable intent used by the first speechlet to set a temperature value of the smart thermostat. The set thermostat intent may expect a parameter representing a value at which to set the thermostat. The slot data "cozy mode" may be sent to the first speechlet. The first speechlet may determine that "cozy mode" is an unrecognized entity for the "set thermostat" intent. For example, the first speechlet may perform a speechlet-specific NLU process to attempt to understand an actionable thermostat setting related to "cozy mode." In another example, the first speechlet may traverse a knowledge graph to attempt to recognize the entity "cozy mode." In the current example, the speechlet may not be able to determine any actionable value (e.g., any value that constitutes a valid parameter for the "set thermostat" intent) for the slot data "cozy mode."

Accordingly, the first speechlet may call the concept teaching component 168. Alternatively, the first speechlet may send data indicating that the slot data "cozy mode" is non-actionable to orchestrator 330 and/or to NLU component 160. Orchestrator 330 and/or NLU component 160 may, in turn, call concept teaching component 168. Concept teaching component 168 may use concept parser 164 to make a determination of whether the first natural language input corresponds to a slot concept phrase that is teachable. For example, concept parser 164 may determine that the intent is recognized, but that one or more slot values are unrecognized by the first speechlet. In some examples, concept parser 164 and/or re-use component 172 may determine if any previously-learned slot values are stored in concept database 170 for the input slot concept phrase.

Processing may continue from action 724 to action 730, at which a dialog session may be initiated with the first user. In various examples, the dialog session may be initiated by the natural language processing system 120 (and/or device 110) outputting audio and/or text that asks the user to describe the action desired by the user. As previously described, the guardrail model 166 may be used to ask progressively simpler questions to learn the desired slot values intended by the user for the intent in the first natural language input received at action 710.

Processing may continue from action 730 to action 740, at which slot data corresponding to the user's desired action may be determined. For example, during the dialog session of action 730, the user may say "party mode" means lights set to 20% brightness. Accordingly, the slot data may be the value 30% brightness that may be associated with the slot data "party mode."

Processing may continue from action 740 to action 750, at which data representing the slot data may be stored in association with the first natural language input. In the current example, the slot value 30% (e.g., a brightness level for a smart light) may be stored in association with the slot data "party mode." The data may be a concept teaching artifact 169 representing the natural language processing system 120 learning that the first user prefers a certain setting/value in response to use of the phrase "party mode."

Figure 8:
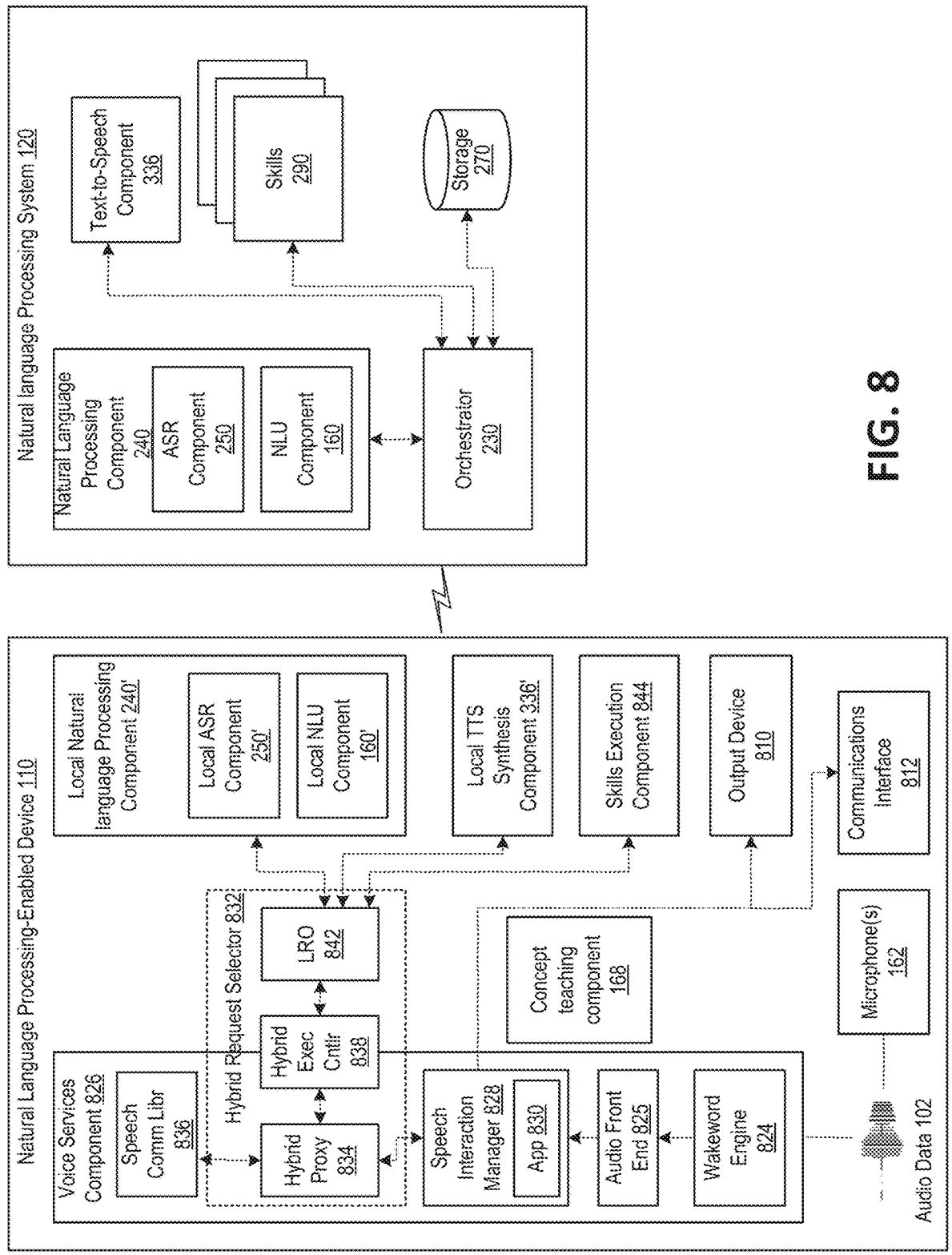
FIG. 8 is a block diagram illustrating a speech processing-enabled device and a speech processing management system, in accordance with embodiments of the present disclosure.

FIG. 8 is a block diagram illustrating a natural language processing-enabled device 110 and a natural language processing system 120, in accordance with embodiments of the present disclosure. In various examples, device 110 may be a natural language processing-enabled device and may include microphones (e.g., far-field microphone arrays) used to transform audio into electrical signals. Natural language processing may then be performed, either locally by the natural language processing-enabled device 110, by one or more other computing devices communicating with the natural language processing-enabled device 110 over a network (e.g., natural language processing system 120), or by some combination of the natural language processing-enabled device 110 and the one or more other computing devices. In various examples, natural language processing-enabled device 110 may include and/or may be configured in communication with output device(s) 810 (e.g., speakers and/or displays) effective to output information obtained in response to a user's spoken request or command, or to output content that may be of interest to one or more users. As used herein, a display of natural language processing-enabled device 110 refers to a display effective to output graphics such as images and/or video. Further, as used herein, a displayless device refers to a device that does not include a display that is effective to render graphical images or text.

In various examples, the device 110 may include a neural network architecture (e.g., a chipset used for matrix and/or tensor-based operations configured to execute machine learning models and/or computer vision processes). As such, device 110 may perform computer vision techniques, audio processing, and/or machine learning techniques locally on device 110 without sending data to remote devices for such processing.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 162 to capture utterances and convert them into digital audio data 102, the natural language processing-enabled device 110 may additionally, or alternatively, receive audio data 102 (e.g., via the communications interface 812) from another device in the environment. In various examples, the natural language processing-enabled device 110 may capture video and/or other image data using a camera. Under normal conditions, the natural language processing-enabled device 110 may operate in conjunction with and/or under the control of a remote, network-based or network-accessible natural language processing system 120. The natural language processing system 120 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 120 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled device 110. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 120 may be configured to receive audio data 102 from the natural language processing-enabled device 110, to recognize speech in the received audio data 102, and to perform functions in response to the recognized speech. In some embodiments, these functions involve sending a command, from the natural language processing system 120, to the natural language processing-enabled device 110 to cause the natural language processing-enabled device 110 to perform an action, such as output an audible response to the user speech via output device 810 (e.g., one or more loudspeakers). Thus, under normal conditions, when the natural language processing-enabled device 110 is able to communicate with the natural language processing system 120 over a WAN (e.g., the Internet), some or all of the functions capable of being performed by the natural language processing system 120 may be performed by sending a command over a WAN to the natural language processing-enabled device 110, which, in turn, may process the command for performing actions. For example, the natural language processing system 120, via a remote command that is included in remote response data, may instruct the natural language processing-enabled device 110 to output an audible response (e.g., using a local text-to-speech (TTS) synthesis component 336) to a user's question, to output content (e.g., music) via output device 810 (e.g., one or more loudspeakers) of the natural language processing-enabled device 110, or to control other devices in the local environment (e.g., the user's home). It is to be appreciated that the natural language processing system 120 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc. In various examples, the natural language processing-enabled device 110 may comprise the concept teaching component 168 to enable the device to learn slot concepts, as described herein.

In order to process voice commands locally, the natural language processing-enabled device 110 may include a local voice services component 826. When a user utterance including the wakeword is captured by the microphone 162 of the natural language processing-enabled device 110, the audio data 102 representing the utterance is received by a wakeword engine 824 of the voice services component 826. The wakeword engine 824 may be configured to compare the audio data 102 to stored models used to detect a wakeword (e.g., "Computer") that indicates to the natural language processing-enabled device 110 that the audio data 102 is to be processed for determining an intent. Thus, the wakeword engine 824 is configured to determine whether a wakeword is detected in the audio data 102, and, if a wakeword is detected, the wakeword engine 824 can proceed with routing the audio data 102 to an audio front end (AFE) 825 (sometimes referred to as an acoustic front end (AFE)) of the voice services component 826. If a wakeword is not detected in the audio data 102, the wakeword engine 824 can refrain from sending the audio data 102 to the AFE 825, thereby preventing the audio data 102 from being further processed. The audio data 102 can be discarded.

The AFE 825 is configured to transform the audio data 102 received from the wakeword engine 824 into data for processing by a suitable ASR component and/or NLU component. The AFE 825 may reduce noise in the audio data 102 and divide the digitized audio data 102 into frames representing a time intervals for which the AFE 825 determines a number of values, called features, representing the qualities of the audio data 102, along with a set of those values, called a feature vector, representing the features/qualities of the audio data 102 within the frame. Many different features may be determined, and each feature represents some quality of the audio data 102 that may be useful for ASR processing and/or NLU processing. A number of approaches may be used by the AFE 825 to process the audio data 102, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 102. Beamforming can be used to distinguish between the directions from which speech and noise originate. Accordingly, the microphones 162 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 102, used by the AFE 825 in beamforming, may be determined based on results of the wakeword engine 824's processing of the audio data 102. For example, the wakeword engine 824 may detect the wakeword in the audio data 102 from a first microphone 162 at time, t, while detecting the wakeword in the audio data 102 from a second microphone 162 a millisecond later in time (e.g., time, t+1 millisecond), and so on and so forth, for any suitable number of audio signals corresponding to multiple microphones 162 in a microphone array.

A speech interaction manager (SIM) 828 of the voice services component 826 may receive the audio data 102 that has been processed by the AFE 825. The SIM 828 may manage received audio data 102 by processing request data and non-speech noise or sounds as events, and the SIM 828 may also manage the processing of commands that are used to respond to the user speech or non-speech noise or sounds (e.g., by controlling the action(s) of the natural language processing-enabled device 110). The SIM 828 may include one or more client applications 830 for performing various functions at the natural language processing-enabled device 110.

A hybrid request selector component 832 of the natural language processing-enabled device 110 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 120. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 120 can be sent to the HEC 838 using the HP 834, which sits in the path between the SCL 836 and the SIM 828. The HP 834 may also be configured to allow audio data 102 received from the SIM 828 to pass through to the natural language processing system 120 (via the SCL 836) while also receiving (e.g., intercepting) this audio data 102 and sending the received audio data 102 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio data 102 (e.g., audio data 102 representing user speech, audio data 102 representing non-speech noise or sounds, etc.). In some embodiments, the hybrid request selector component 832 may further include a local request orchestrator component (LRO) 842. The LRO 842 is configured to notify the local natural language processing component 240' about the availability of new audio data 102 that represents user speech, and to otherwise initiate the operations of the local natural language processing component 240' when new audio data 102 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio data 102 (e.g., by instructing the local natural language processing component 240' to execute on a previously-determined intent in order to generate a command). Meanwhile, a "terminate" event may instruct the local natural language processing component 240' to terminate further execution based on the audio data 102, such as when the natural language processing-enabled device 110 receives command data from the natural language processing system 120 and chooses to use that remotely-generated command data.

The LRO 842 may interact with a skills execution component 844 that is configured to receive intent data output from the local natural language processing component 240' and to execute a skill based on the intent.

To illustrate how the natural language processing-enabled device 110 can operate at runtime, consider an example where a user utters an expression, such as "Computer, turn off the kitchen lights." The audio data 102 is received by the wakeword engine 824, which detects the wakeword "Computer," and forwards the audio data 102 to the SIM 828 via the AFE 825 as a result of detecting the wakeword. The SIM 828 may send the audio data 102 to the HP 834, and the HP 834 may allow the audio data 102 to pass through to the natural language processing system 120 (e.g., via the SCL 836), and the HP 834 may also input the audio data 102 to the local natural language processing component 240' by routing the audio data 102 through the HEC 838 of the hybrid request selector 832, whereby the LRO 842 notifies the local natural language processing component 240' of the incoming audio data 102. At this point, the hybrid request selector 832 may wait for response data from the natural language processing system 120 and/or the local natural language processing component 240'.

The local natural language processing component 240' is configured to receive the audio data 102 from the hybrid request selector 832 as input, to recognize speech (and/or non-speech audio events) in the audio data 102, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network 104. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 102 to convert the audio data 102 into text data (sometimes referred to herein as "ASR text data," an "ASR result", or "ASR data"). ASR transcribes audio data 102 into text data representing the words of the user speech contained in the audio data 102. A spoken utterance in the audio data 102 can be input to the local ASR component 250', which then interprets the utterance based on the similarity between the utterance and pre-established language models available to the local natural language processing component 240'. In some embodiments, the local ASR component 250' outputs the most likely text recognized in the audio data 102, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the natural language processing-enabled device 110 is registered. For instance, the language models (and other data) used by the local ASR component 250' may be based on known information (e.g., preferences) of the user, and/or on a history of previous interactions with the user.

The local natural language processing component 240' may also include a local NLU component 160' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 160' takes textual input (such as text data generated by the local ASR component 250') and attempts to make a semantic interpretation of the ASR text data.

Natural Language Processing System

In other situations, the natural language processing-enabled device 110 may send the audio data 102 to the natural language processing system 120 for processing. As described above, the natural language processing-enabled device 110 may capture audio using the microphone 162, and send audio data 102 (e.g., representing a spoken user request), corresponding to the captured audio, to the natural language processing system 120. The natural language processing-enabled device 110 may include a wakeword detection component that detects when input audio includes a spoken wakeword, and when the wakeword is detected, the audio data 102 is sent by the natural language processing-enabled device 110 to the natural language processing system 120.

Upon receipt by the natural language processing system 120, the audio data 102 may be sent to an orchestrator 230. The orchestrator 230 may include memory and logic that enables the orchestrator 230 to send various pieces and forms of data to various components of the system.

Similar to the operation described above with respect to the local natural language processing component 240' of the natural language processing-enabled device 110, the orchestrator 230 may send the audio data 102 to a natural language processing component 240. An ASR component 250 of the natural language processing component 240 transcribes the audio data 102 into one or more hypotheses representing speech contained in the audio data 102. The natural language processing component 240 interprets the speech in the audio data based on a similarity between the characteristics of the audio data corresponding to the speech and pre-established language models. For example, the natural language processing component 240 may compare the audio data 102 with models for sounds (e.g., subword units such as phonemes) and sequences of sounds to identify words that match the sequence of sounds in the speech represented in the audio data 102. The natural language processing component 240 may send text data generated thereby to an NLU component 160 of the natural language processing component 240. The text data output by the natural language processing component 240 may include a top scoring hypothesis of the speech represented in the audio data 102 or may include an N-best list including a group of hypotheses of the speech represented in the audio data 102, and potentially respective scores ASR processing confidence scores.

The NLU component 160 attempts to make a semantic interpretation of the phrases or statements represented in the text data input therein. That is, the NLU component 160 determines one or more meanings associated with the phrases or statements represented in the text data based on individual words represented in the text data. The NLU component 160 interprets a text string to derive an intent of the user (e.g., an action that the user desires be performed) as well as pertinent pieces of information in the text data that allow a device (e.g., the natural language processing system 120) to complete the intent. For example, if the text data corresponds to "Play the new album by [Musical Artist]", the NLU component 160 may determine the user intended to invoke a music playback intent to play the identified album.

The natural language processing system 120 may include a non-transitory computer-readable memory storage 270, storing various instructions for operation of the natural language processing system 120.

As described above, the natural language processing system 120 may include one or more skills 290. The natural language processing system 120 may also include a TTS component 336 that synthesizes speech (e.g., generates audio data) corresponding to text data input therein. The TTS component 336 may perform speech synthesis using one or more different methods. In one method of synthesis called unit selection, the TTS component 336 matches text data against one or more databases of recorded speech. Matching units are selected and concatenated together to form audio data. In another method of synthesis called parametric synthesis, the TTS component 336 varies parameters such as frequency, volume, and noise to create an artificial speech waveform output. Parametric synthesis uses a computerized voice generator, sometimes called a vocoder.

The various components of the natural language processing system 120 and the natural language processing-enabled device 110 described herein may be implemented in software, hardware, firmware, or some combination thereof.

The natural language processing system 120 may reside on natural language processing-enabled device 110, in a cloud computing environment, or some combination thereof. For example, the natural language processing-enabled device 110 may include computing equipment, some portion of which is configured with some or all of the components or functionality of natural language processing system 120 and another portion of which is configured with some or all of the components or functionality of computing device(s) used in natural language processing system 120. The natural language processing-enabled device 110 may then perform a variety of functions on its own (such as when remote communications are unavailable), and/or may communicate (when capable) with computing device(s) and/or the natural language processing system 120 to perform other functions. Alternatively, all of the functionality may reside on the natural language processing-enabled device 110 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s).

The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving first natural language input data representing a request;
determining first intent data representing a semantic interpretation of the first natural language input data;
determining that first slot data represents a first entity of the first natural language input data, the first entity being unrecognized;
determining using the first natural language input data and the first slot data, that the first entity is teachable;
generating first data representing a first prompt for clarification of the first entity;
outputting first audio representing the first data using a text to speech (TTS) component;
receiving, based at least in part on the first prompt, second slot data;
sending the second slot data to a natural language understanding component;
determining, by the natural language understanding component, that the second slot data is undefined;
generating second data representing a second prompt requesting clarification of the second slot data;
outputting second audio data representing the second data using the TTS component;
receiving second natural language input data representing a response to the second prompt;
determining, by a validation component, that the second natural language input data is recognized by a first speechlet configured to process the first intent data;
storing third data in a non-transitory computer-readable memory, the third data representing an association between the first slot data and the second natural language input data; and
executing a first action by the first speechlet using the first intent data and the third data.

2. The method of claim 1, further comprising:
receiving third natural language input data representing a second request;
determining that second slot data of the third natural language input data represents the first entity;
searching the non-transitory computer-readable memory using the second slot data;
receiving the third data from the non-transitory computer-readable memory; and
executing the first action by the first speechlet using the third data.

3. The method of claim 1, further comprising:
receiving third natural language input data representing a second request;
determining second intent data representing a second semantic interpretation of the third natural language input data, wherein the second intent data is different from the first intent data;
determining that second slot data of the third natural language input data represents the first entity;
determining that the first intent data is related to a first slot data type;
determining that the second intent data is related to the first slot data type; and
executing a second action by a second speechlet using the second intent data and the third data.

4. A method comprising:
receiving first data representing a first natural language input;
receiving, by a first component, first slot data representing a portion of the first natural language input that comprises an unrecognized entity;
determining, by the first component, using the first data and the first slot data, that the unrecognized entity is teachable;
generating a first prompt for clarification of the unrecognized entity;
receiving, based at least in part on the first prompt, second slot data;
sending the second slot data to a natural language understanding component;

determining, by the natural language understanding component, that the second slot data is undefined;
generating second data representing a second prompt requesting clarification of the second slot data;
outputting audio data representing the second prompt;
determining third slot data representing input received based at least in part on the second prompt; and
storing the third slot data in association with the first natural language input in a database.

5. The method of claim 4, further comprising:
receiving a second natural language input;
determining that the second natural language input comprises the unrecognized entity;
receiving the third slot data from the database; and
processing the second natural language input using the third slot data.

6. The method of claim 4, further comprising:
receiving a second natural language input;
determining that the second natural language input comprises a second unrecognized entity represented by fourth slot data;
initiating a dialog session;
receiving, during the dialog session, a third natural language input;
determining that the third natural language input is unrelated to the dialog session; and
terminating the dialog session.

7. The method of claim 4, further comprising:
determining a first speechlet for processing the first natural language input;
sending the data representing the third slot data in association with the first natural language input to the first speechlet;
receiving a second natural language input comprising the unrecognized entity; and
processing the second natural language input by the first speechlet using the third slot data.

8. The method of claim 4, further comprising:
determining a first intent comprising a first semantic representation of the first natural language input;
determining a first type of the first slot data;
storing metadata indicating the first type of the first slot data in association with the third slot data in the database;
receiving a second natural language input comprising the unrecognized entity;
determining a second intent comprising a second semantic representation of the second natural language input, wherein the second intent is different from the first intent;
determining that the first type of the third slot data is used by a first speechlet to process the second intent; and
processing, by the first speechlet, the second natural language input using the third slot data.

9. The method of claim 4, further comprising:
generating second data representing a request to store the third slot data in the database; and
receiving a second natural language input representing an authorization to store the third slot data in the database, wherein the data representing the third slot data is stored in the database in response to the authorization.

10. The method of claim 4, further comprising:
determining a device type with which a user is interacting;
determining a modality of the device type; and
generating the first prompt based at least in part on the modality.

11. The method of claim 4, further comprising:
generating output data requesting clarification of the unrecognized entity; and
receiving a second natural language input during a dialog session comprising the third slot data.

12. A system comprising:
at least one processor; and
non-transitory computer-readable memory storing instructions that, when executed by the at least one processor, are effective to cause the at least one processor to:
receive first data representing a first natural language input;
receive, by a first component, first slot data representing a portion of the first natural language input that comprises an unrecognized entity;
determine, by the first component, using the first data and the first slot data, that the unrecognized entity is teachable;
generate a first prompt for clarification of the unrecognized entity;
receive, based at least in part on the first prompt, second slot data;
send the second slot data to a natural language understanding component;
determine, by the natural language understanding component, that the second slot data is undefined;
generate second data representing a second prompt requesting clarification of the second slot data;
output audio data representing the second prompt;
determine third slot data representing input received based at least in part on the second prompt; and
store the third slot data in association with the first natural language input in a database.

13. The system of claim 12, the non-transitory computer-readable memory storing further instructions that, when executed by the at least one processor, are further effective to cause the at least one processor to:
receive a second natural language input;
determine that the second natural language input comprises the unrecognized entity;
receive the third slot data from the database; and
process the second natural language input using the third slot data.

14. The system of claim 12, the non-transitory computer-readable memory storing further instructions that, when executed by the at least one processor, are further effective to cause the at least one processor to:
receive a second natural language input;
determine that the second natural language input comprises a second unrecognized entity represented by fourth slot data;
initiate a dialog session;
receive, during the dialog session, a third natural language input;
determine that the third natural language input is unrelated to the dialog session; and
terminate the dialog session.

15. The system of claim 12, the non-transitory computer-readable memory storing further instructions that, when executed by the at least one processor, are further effective to cause the at least one processor to:
determine a first speechlet for processing the first natural language input;
send the data representing the third slot data in association with the first natural language input to the first speechlet;

receive a second natural language input comprising the unrecognized entity; and process the second natural language input by the first speechlet using the third slot data.

16. The system of claim 12, the non-transitory computer-readable memory storing further instructions that, when executed by the at least one processor, are further effective to cause the at least one processor to:

determine a first intent comprising a first semantic representation of the first natural language input;

determine a first type of the first slot data;

store metadata indicating the first type of the first slot data in association with the third slot data in the database;

receive a second natural language input comprising the unrecognized entity;

determine a second intent comprising a second semantic representation of the second natural language input, wherein the second intent is different from the first intent;

determine that the first type of the third slot data is used by a first speechlet to process the second intent; and process, by the first speechlet, the second natural language input using the third slot data.

17. The system of claim 12, the non-transitory computer-readable memory storing further instructions that, when executed by the at least one processor, are further effective to cause the at least one processor to:

generate second data representing a request to store the third slot data in the database; and receive a second natural language input representing an authorization to store the third slot data in the database, wherein the data representing the third slot data is stored in the database in response to the authorization.

18. The system of claim 12, the non-transitory computer-readable memory storing further instructions that, when executed by the at least one processor, are further effective to cause the at least one processor to:

determine a device type with which a user is interacting;

determine a modality of the device type; and generate the first prompt based at least in part on the modality.

* * * * *